United States Patent
Jang et al.

(10) Patent No.: US 8,415,853 B2
(45) Date of Patent: Apr. 9, 2013

(54) STATOR FOR COMPRESSOR MOTOR

(75) Inventors: Jeong Cheol Jang, Gwangju (KR); Ji Min Lee, Gwangju (KR)

(73) Assignee: New Motech Co., Ltd., Gwangju (KR)

( * ) Notice: Subject to any disclaimer, the term of this patent is extended or adjusted under 35 U.S.C. 154(b) by 0 days.

(21) Appl. No.: 13/422,394

(22) Filed: Mar. 16, 2012

(65) Prior Publication Data
US 2012/0175992 A1 Jul. 12, 2012

Related U.S. Application Data

(63) Continuation of application No. PCT/KR2010/007307, filed on Oct. 23, 2010.

(30) Foreign Application Priority Data

Nov. 3, 2009 (KR) .................. 10-2009-0105517

(51) Int. Cl.
*H02K 3/34* (2006.01)
(52) U.S. Cl. ........................ 310/215; 310/214
(58) Field of Classification Search .......... 310/214–215, 310/71, 194, 216.114–216.115
See application file for complete search history.

(56) References Cited

U.S. PATENT DOCUMENTS

| | | | | |
|---|---|---|---|---|
| 7,262,540 B2* | 8/2007 | Lee | ........................ | 310/216.004 |
| 7,342,344 B2* | 3/2008 | Lee | ........................ | 310/216.044 |
| 7,821,175 B2* | 10/2010 | Ionel et al. | ............. | 310/216.009 |
| 8,076,819 B2* | 12/2011 | Taema | ........................ | 310/215 |
| 2005/0189837 A1* | 9/2005 | Lee | ................. | 310/217 |
| 2009/0324435 A1* | 12/2009 | Sears et al. | ................. | 417/423.7 |
| 2010/0264757 A1* | 10/2010 | Asou et al. | ...................... | 310/43 |
| 2011/0109189 A1* | 5/2011 | Taema | .......................... | 310/215 |
| 2011/0204742 A1* | 8/2011 | Nakayama et al. | ........... | 310/215 |
| 2011/0221297 A1* | 9/2011 | Langford et al. | ............. | 310/215 |

FOREIGN PATENT DOCUMENTS

| | | |
|---|---|---|
| JP | 2001-112205 A | 4/2001 |
| JP | 2009-038947 A | 2/2009 |
| KR | 10-2004-0044711 A | 5/2004 |
| KR | 10-2006-0027704 A | 3/2006 |
| KR | 10-2006-0078845 A | 7/2006 |

* cited by examiner

*Primary Examiner* — Thanh Lam
(74) *Attorney, Agent, or Firm* — Sherr & Jiang, PLLC

(57) ABSTRACT

A stator for a compressor motor that has a structure in which the ends of insulation films inserted into slots of a stator core are supportedly locked to locking protrusions formed on upper and lower insulators for insulating the upper and lower sides of the stator core, thereby allowing the insulation films to be securely supported and providing easy assembling process for the insulation film and the upper and lower insulators.

2 Claims, 7 Drawing Sheets

STATOR FOR COMPRESSOR MOTOR

CROSS REFERENCE TO PRIOR APPLICATIONS

This application claims the benefit under 35 U.S.C. §120 and §365(c) to a prior PCT International Patent Application No. PCT/KR2010/007307 (filed on Oct. 23, 2010 and designating the U.S.), which claims priority to Korean Patent Application No. 10-2009-0105517 (filed on Nov. 3, 2009), which are all hereby incorporated by reference in their entirety.

BACKGROUND

In general, a motor is used in a compressor of freezing and refrigerating equipment, and the motor largely includes a stator and a rotor. The stator is in general configured to have teeth spaced apart by a predetermined distance around a stator core and having slots formed therebetween and to allow coils to be wound on the teeth, and insulators are used for insulation between the coils wound on the teeth and the stator core.

Generally, the insulator in conventional motors largely includes an upper insulator and a lower insulator made through plastic injection molding, wherein the upper insulator and the lower insulator are assembled to each other as one unit in such a manner as to completely cover the stator core.

By the way, in case where the upper insulator and the lower insulator are made through the plastic injection molding, the stacked heights of the stator core may be varied, and in this case, the molds for molding the upper insulator and the lower insulator are separately manufactured in accordance with the varied heights of the stator core. Further, since the upper insulator and the lower insulator are plastic injection-molded materials, they have a predetermined thickness so that the spaces, that is, the slots, between the teeth of the stator core become narrow to cause the spaces in which the coils are wound to be reduced. Moreover, since the upper insulator and the lower insulator are formed to cover the entire teeth of the stator core, a quantity of the plastic material used becomes increased.

SUMMARY

Accordingly, the present invention has been made in view of the above-mentioned problems occurring in the prior art, and it is an object of the present invention to provide a stator for a compressor motor that is configured wherein upper and lower insulators are adapted to cover the upper and lower sides of a stator core and insulation films are adapted to be inserted between the upper and lower insulators, such that even though the stacked heights of the stator core are varied, there is no need to separately manufacture the molds for molding the upper and lower insulators.

It is another object of the present invention to provide a stator for a compressor motor that is configured wherein upper and lower insulators have a substantially thin thickness, such that the slots formed between the teeth of a stator core become enlarged to ensure the spaces in which coils are wound.

It is still another object of the present invention to provide a stator for a compressor motor that is configured wherein upper and lower insulators are provided to partially cover the upper and lower sides of the teeth of a stator core, such that a quantity of a plastic material used becomes reduced.

It is yet still another object of the present invention to provide a stator for a compressor motor that is configured wherein the ends of each of insulation films to be inserted into slots of a stator core are supportedly locked to locking protrusions formed on insulators for insulating the upper and lower sides of the stator core, thereby allowing the insulation films to be securely supported and providing easy assembling process for the insulation film and the upper and lower insulators.

The above objects and other objects of the present invention will be easily achieved by a preferred embodiment of the present invention as will be described below.

To accomplish the above objects, according to the present invention, there is provided a stator for a compressor motor having a stator core having an annular back yoke and a plurality of teeth protruded annularly inwardly from the inner periphery of the back yoke and having slots formed therebetween; an upper insulator having an annular body portion formed correspondingly to the back yoke of the stator core and a plurality of teeth insulating portions formed correspondingly to the teeth of the stator core in such a manner as to be protruded annularly from the body portion, thereby covering the upper sides of the teeth of the stator core; a lower insulator having an annular body portion formed correspondingly to the back yoke of the stator core and a plurality of teeth insulating portions formed correspondingly to the teeth of the stator core in such a manner as to be protruded annularly from the body portion, thereby covering the lower sides of the teeth of the stator core; a plurality of insulation films each adapted to be inserted into the slot so as to cover the side of the stator core exposed to the inside of the slot between the upper insulator and the lower insulator, each of the insulation films having a center portion adapted to cover the inner side of the back yoke of the stator core exposed to the slot between the upper insulator and the lower insulator and side portions extended bent from both sides of the center portion so as to cover the sides of the teeth of the stator core; and coils adapted to be wound on the teeth of the stator core enclosed by the upper insulator, the lower insulator and the insulation films, the stator including: teeth front end portions protruded in both side directions from the front ends of the teeth of the stator core; front end portions bent inwardly from the ends of the side portions of each of the insulation films so as to cover the inner sides of the teeth front end portions of the stator core; front end supporting portions protruded downwardly from both sides of the teeth insulating portions of the upper insulator so as to cover the top end edges of the inner sides of the teeth front end portions of the stator core; locking protrusions protruded downwardly from the inner sides of the front end supporting portions of the upper insulator in a state of being spaced apart from the front end supporting portions, such that the top end edges of the front end portions of each of the insulation films are supportedly inserted between the front end supporting portions and the locking protrusions; front end supporting portions protruded upwardly from both sides of the teeth insulating portions of the lower insulator so as to cover the bottom end edges of the inner sides of the teeth front end portions of the stator core; and locking protrusions protruded upwardly from the inner sides of the front end supporting portions of the lower insulator in a state of being spaced apart from the front end supporting portions, such that the bottom end edges of the front end portions of each of the insulation films are supportedly inserted between the front end supporting portions and the locking protrusions.

According to the present invention, desirably, the stator core has a plurality of coupling holes formed on the top and underside thereof, and the upper and lower insulators have a plurality of coupling protrusions formed at the positions corresponding to the coupling holes of the stator core in such a manner as to be inserted into the coupling holes of the stator core.

Under the above-mentioned structure, the stator for the compressor motor according to the present invention has the following advantages:

Firstly, the upper and lower insulators are adapted to cover the upper and lower sides of the stator core and the insulation films are adapted to be inserted between the upper and lower insulators, such that even though the stacked heights of the stator core are varied, there is no need to separately manufacture the molds for molding the upper and lower insulators.

Secondly, the upper and lower insulators have a substantially thin thickness, such that the slots formed between the teeth of the stator core become enlarged to ensure the spaces in which coils are wound.

Thirdly, the upper and lower insulators are provided to partially cover the upper and lower sides of the teeth of the stator core, such that a quantity of a plastic material used becomes reduced.

Lastly, the ends of each of the insulation films to be inserted into the slots of the stator core are supportedly locked to the locking protrusions formed on the upper and lower insulators for insulating the upper and lower sides of the stator core, thereby allowing the insulation films to be securely supported and providing easy assembling process for the insulation film and the upper and lower insulators.

DRAWINGS

DESCRIPTION

Hereinafter, an explanation on a stator for a compressor motor according to the present invention will be in detail given with reference to the attached drawings.

Figure 1:
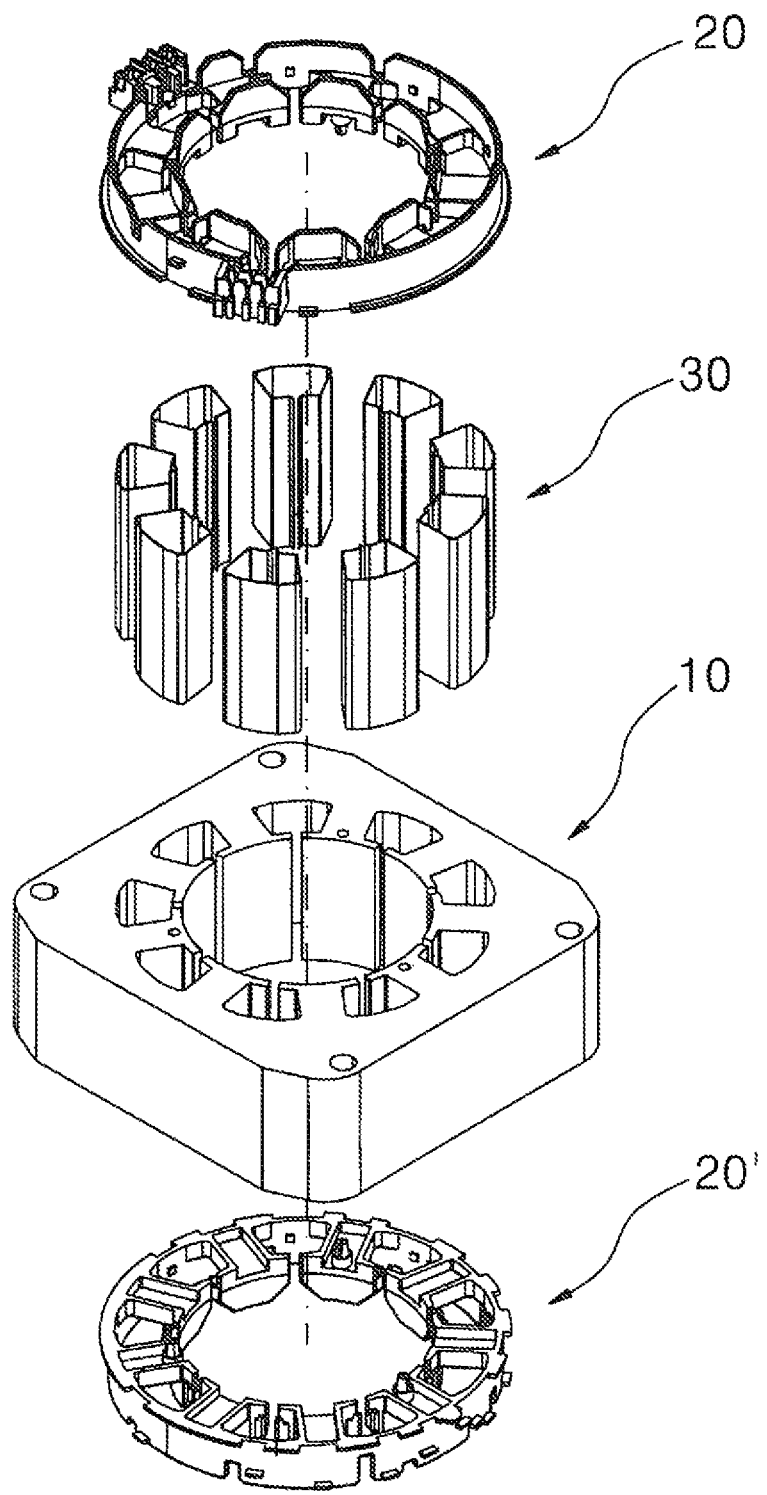
FIG. 1 is an exploded perspective view showing a stator for a compressor motor according to the present invention.
Figure 2:
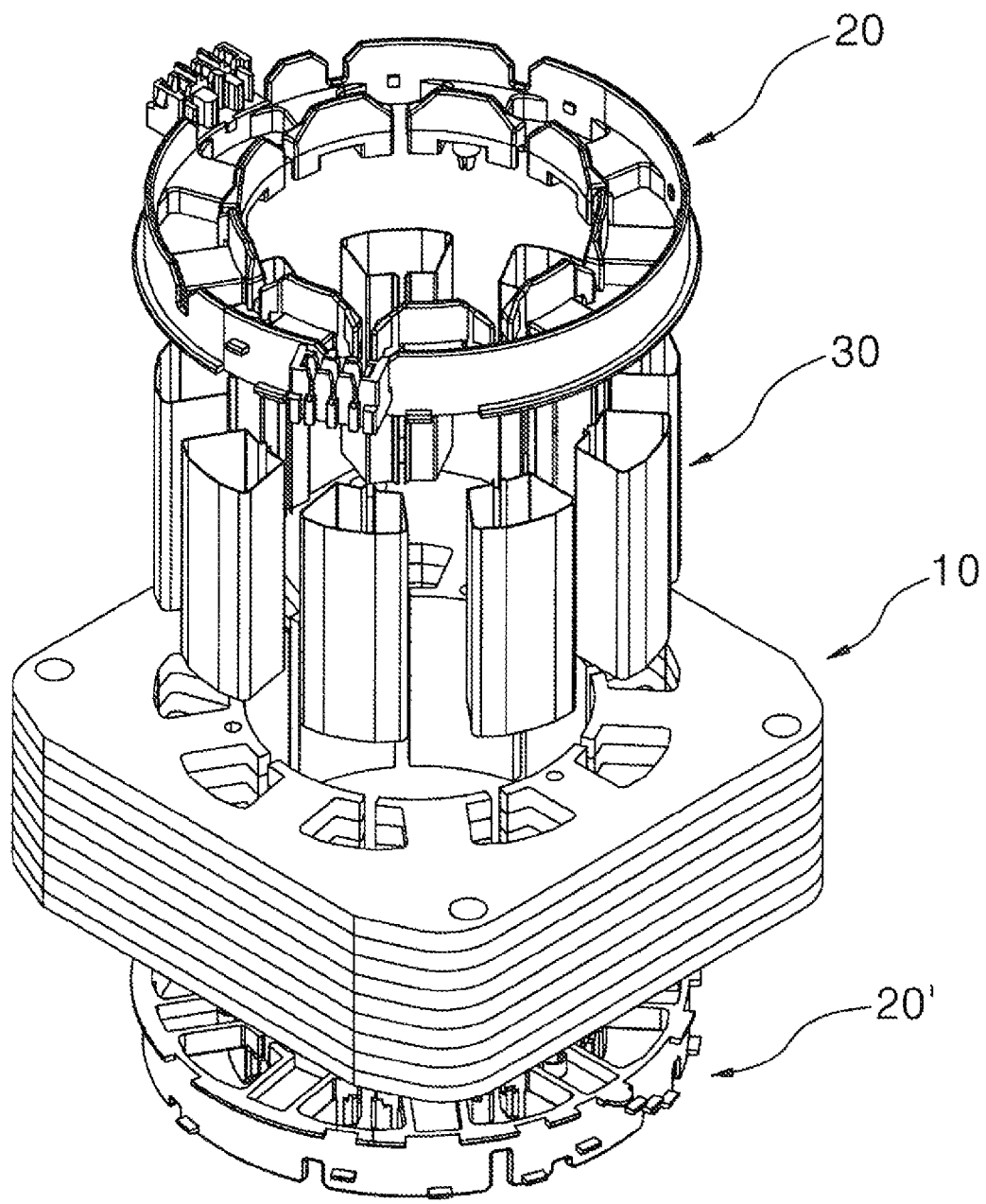
FIG. 2 is an exploded perspective view showing an assembling state of the stator for a compressor motor according to the present invention.
Figure 3:
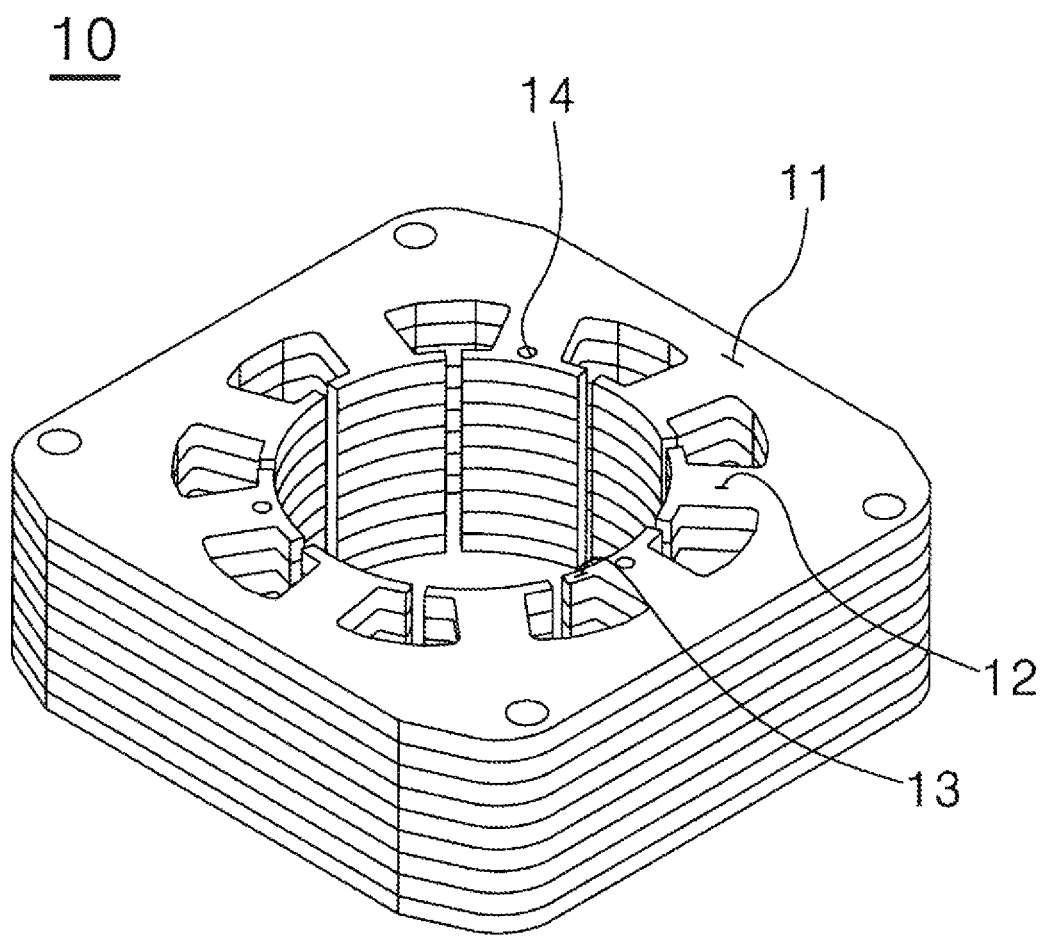
FIG. 3 is a perspective view showing the stacked stator core of the stator for a compressor motor according to the present invention.
Figure 4:
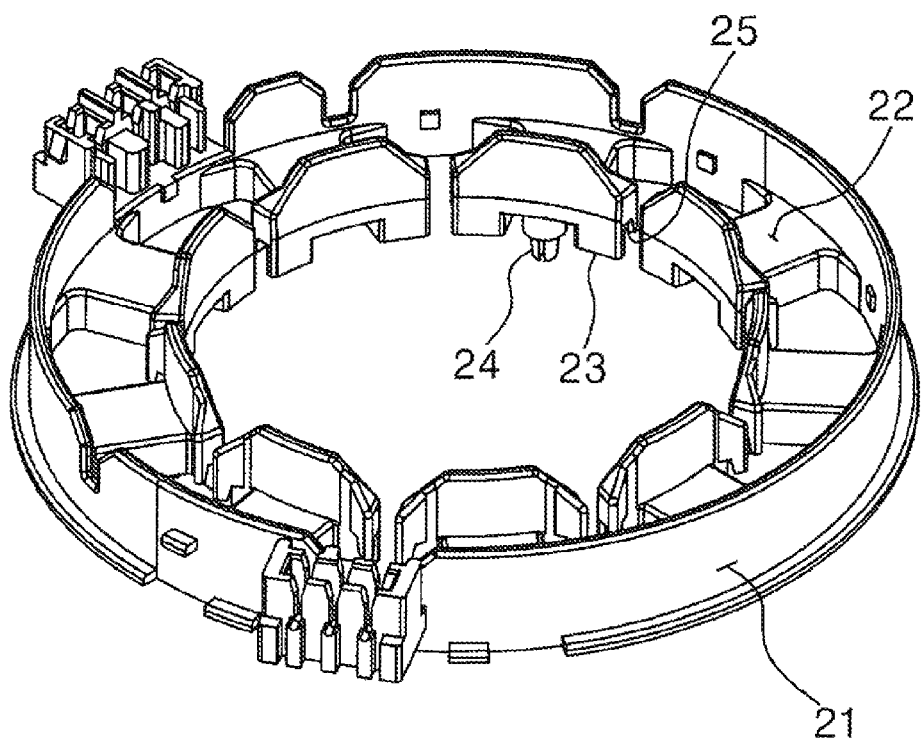
FIG. 4 is a perspective view showing an upper insulator of the stator for a compressor motor according to the present invention.
Figure 5:
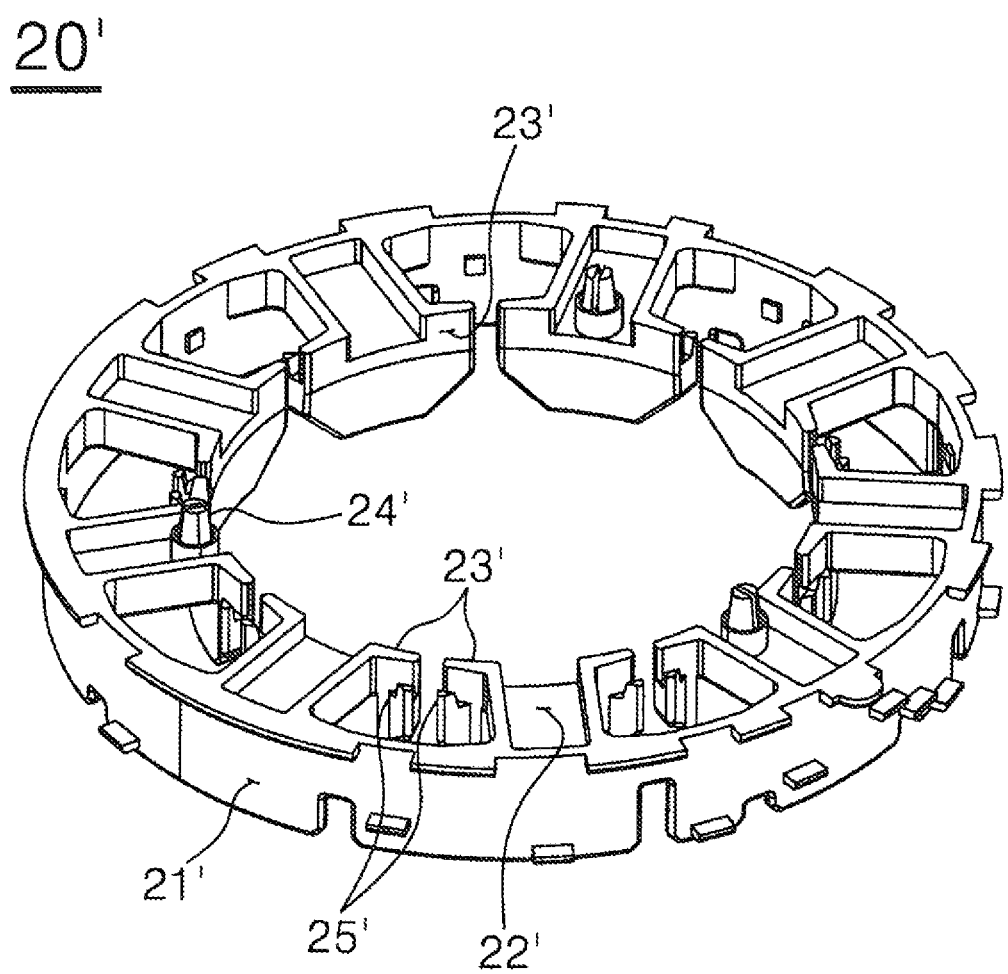
FIG. 5 is a perspective view showing a lower insulator of the stator for a compressor motor according to the present invention.
Figure 6:
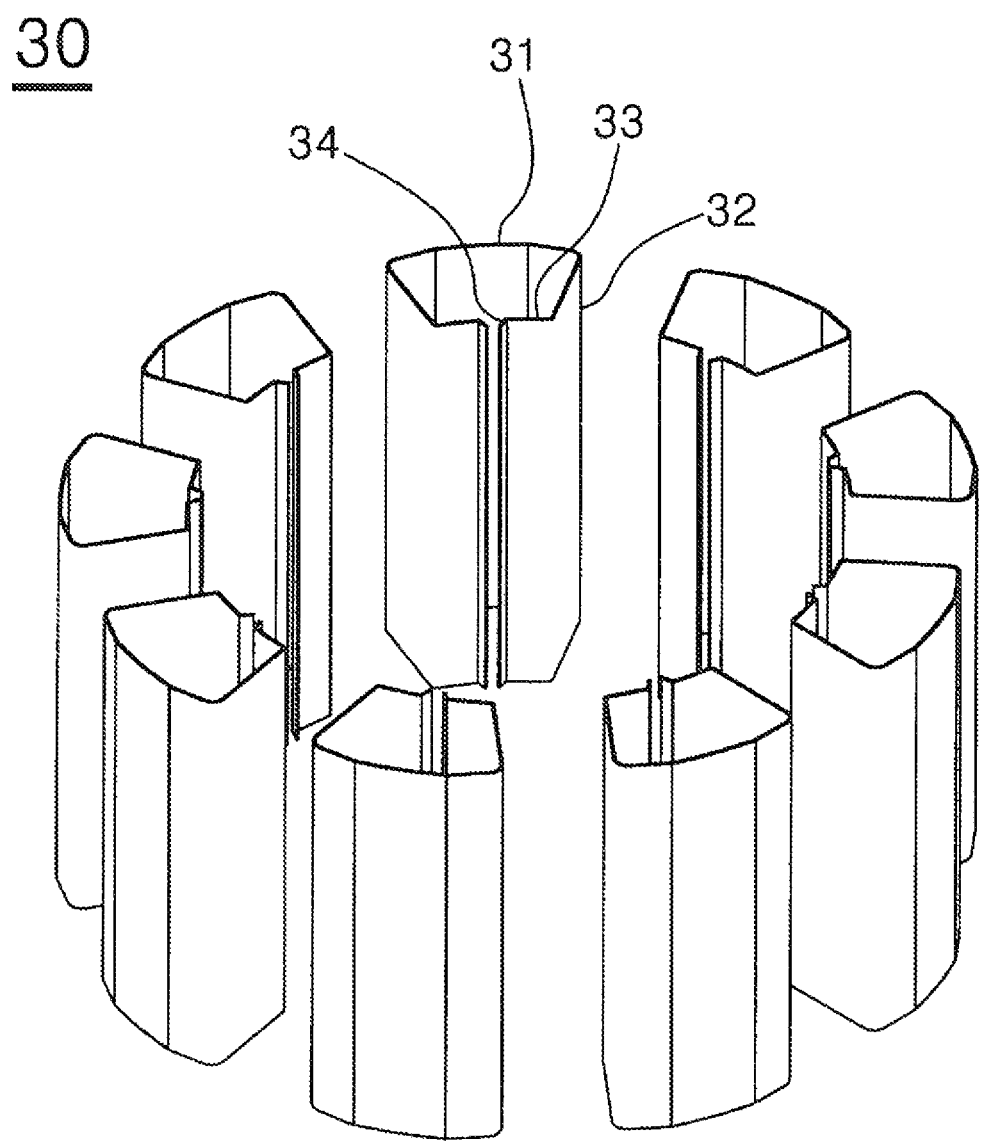
FIG. 6 is a perspective view showing insulation films of the stator for a compressor motor according to the present invention.
Figure 7:
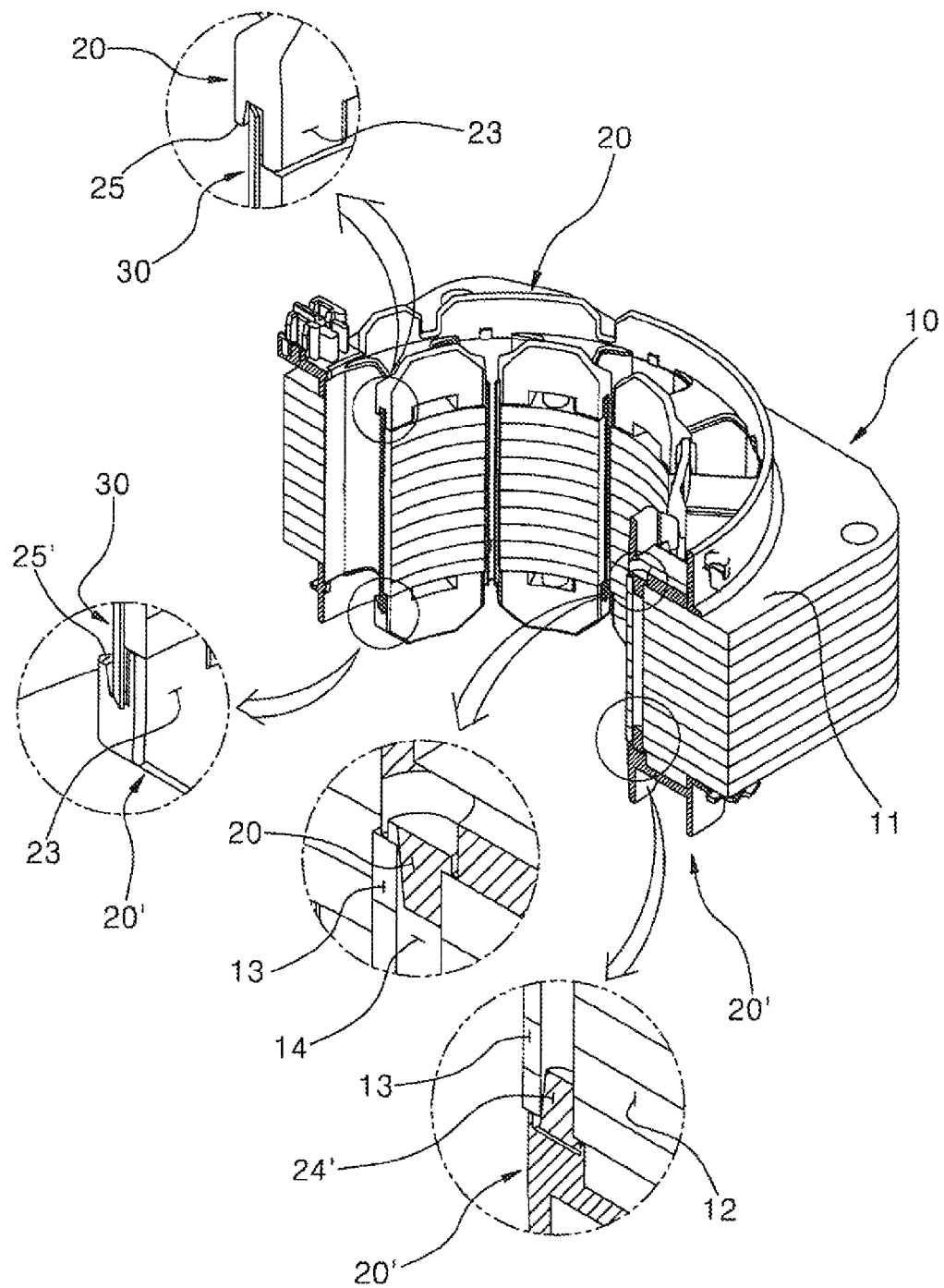
FIG. 7 is a cut perspective view showing the section of the stator for a compressor motor according to the present invention.

FIG. 1 is an exploded perspective view showing a stator for a compressor motor according to the present invention, FIG. 2 is an exploded perspective view showing an assembling state of the stator for a compressor motor according to the present invention, FIG. 3 is a perspective view showing the stacked stator core of the stator for a compressor motor according to the present invention, FIG. 4 is a perspective view showing an upper insulator of the stator for a compressor motor according to the present invention, FIG. 5 is a perspective view showing a lower insulator of the stator for a compressor motor according to the present invention, FIG. 6 is a perspective view showing insulation films of the stator for a compressor motor according to the present invention and FIG. 7 is a cut perspective view showing the section of the stator for a compressor motor according to the present invention.

Referring to the drawings, a stator for a compressor motor according to the present invention constitutes the motor together with a rotor (which is not shown in the drawings) disposed to rotate inside the stator. The present invention relates to the structure of the stator for the compressor motor, and accordingly, an explanation on the stator for the compressor motor will be given below.

The stator for the compressor motor according to the present invention largely includes a stator core 10, an upper insulator 20, a lower insulator 20', insulation films 30 and coils (not shown).

The stator core 10 has an annular back yoke 11 having a rotor insertion hole formed to be passed vertically therethrough so as to rotatably insert a rotor thereinto and a plurality of teeth 12 protruded inwardly in a radial direction from an inner circumference of the rotor insertion hole of the back yoke 11. Slots are formed between the adjacent teeth 111. The stator core 10 has a plurality of teeth front end portions 13 projected in both side directions from the front ends of the teeth 112 so as to form large magnetic poles to the front ends of the teeth 12. The stator core 10 has coupling holes 14 formed on the top and underside coupled to the upper and lower insulators 20 and 20', and referring to drawings, the coupling holes 14 are formed on the top and underside of the ends of a portion of the teeth 12 or the entire teeth 12 of the stator core 10. Into the coupling holes 14 are insertedly provided coupling protrusions 24 and 24' that are formed on the upper and lower insulators 20 and 20'. Typically, the stator core 10 is made of steel plates punched and stacked.

A coil is wound on each of the teeth 12 of the stator core 10. Since the teeth 112 are in general made of a conductive material, however, insulators are provided between each of the teeth 112 and the coil for insulation between them. According to the stator for the compressor motor according to the present invention, the upper and lower sides of the stator core 10 are insulated from each other by means of upper and lower insulators 20 and 20', and the upper and lower insulators 20 and 20' are by means of the insulation films 30.

The upper insulator 20 and the lower insulator 20' are coupled to the stator core 10 in such a manner as to cover the upper and lower sides of the stator core 10. Accordingly, the upper insulator 20 and the lower insulator 20' include portions having the shapes corresponding to the back yoke 11, the teeth 12 and the teeth front end portions 13 of the stator core 10.

Referring to the drawings, the upper insulator 12 has an annular body portion 21 formed correspondingly to the back yoke 11 of the stator core 10, a plurality of teeth insulating portions 22 formed correspondingly to the teeth 12 of the stator core 10 in such a manner as to be protruded annularly from the body portion 21, thereby covering the upper sides of the teeth 12 of the stator core 10, and a plurality of front end supporting portions 23 formed correspondingly to the teeth front end portions 13 in such a manner as to be protruded downwardly from the teeth insulating portions 22, thereby being in contact with the top end edges of the teeth front end portions 13 of the stator core 10.

Further, the upper insulator 20 has a plurality of locking protrusions 25 protruded downwardly from the inner sides of the front end supporting portions 23 in a state of being spaced apart from the front end supporting portions 23, such that the top end edges of front end portions 33 of the insulation films 30 as will be discussed later are inserted between the front end supporting portions 23 and the locking protrusions 25 and supportedly fitted to a gap formed between the front end supporting portions 23 and the locking protrusions 25.

On the other hand, the upper insulator 20 has a plurality of coupling protrusions 24 formed on the underside portions of the ends of the teeth insulating portions 22 at the positions corresponding to the coupling holes 14 formed on the top portions of the ends of the teeth 12 of the stator core 10 such that the coupling protrusions 24 are inserted into the coupling holes 14 to couple the upper insulator 20 and the stator core 10.

The lower insulator 20' has an annular body portion 21' formed correspondingly to the back yoke 11 of the stator core 10, a plurality of teeth insulating portions 22' formed correspondingly to the teeth 12 of the stator core 10 in such a manner as to be protruded annularly from the body portion 21, thereby covering the lower sides of the teeth 12 of the stator core 10, and a plurality of front end supporting portions 23' formed correspondingly to the teeth front end portions 13 in such a manner as to be protruded upwardly from the teeth insulating portions 22', thereby being supported by the bottom ends of the teeth front end portions 13 of the stator core 10.

Further, the lower insulator 20' has a plurality of locking protrusions 25' protruded upwardly from the inner sides of the front end supporting portions 23' in a state of being spaced apart from the front end supporting portions 23', such that the bottom end edges of the front end portions 33 of the insulation films 30 are inserted between the front end supporting portions 23' and the locking protrusions 25' and supportedly fitted to a gap formed between the front end supporting portions 23' and the locking protrusions 25'.

On the other hand, the lower insulator 20' has a plurality of coupling protrusions 24' formed on the top portions of the ends of the teeth insulating portions 22' at the positions corresponding to the coupling holes 14 formed on the underside portions of the ends of the teeth 12 of the stator core 10 such that the coupling protrusions 24' are inserted into the coupling holes 14 to couple the lower insulator 20' and the stator core 10.

Each of the insulation films 30 is insertedly fixed to the slot formed between adjacent teeth 12 of the stator core 10. Accordingly, when the coils are wound on the teeth 12, insulation is formed between the sides of the teeth 12 and the coils. Since the insulation film 30 has a substantially thin thickness, the slot is enlarged to permit a volume of coils wound to be increased. Also, since the insulation film 30 is cut to the stacked height of the stator core 10 and is inserted into the slot, there is no need to separately manufacture the upper and lower insulators 20 and 20' in accordance with the stacked heights of the stator core 10, thereby reducing the manufacturing cost of the motor.

The insulation film 30 is formed correspondingly to the slot formed between adjacent teeth 12 and is desirably made of a polyester material having predetermined elasticity. The insulation film 30 serves to cover the sides of the stator core 10 exposed as the slots between the upper insulator 20 and the lower insulator 20'.

Referring to the drawings, the insulation film 30 is adapted to cover the sides of the stator core 10 exposed to the inside of the slots between the upper insulator 20 and the lower insulator 20', and the insulation film 30 includes a center portion 31 adapted to cover the side of the back yoke 11 of the stator core 10 exposed to the slot between the upper insulator 20 and the lower insulator 20' and side portions 32 extended bent from both sides of the center portion 31 to have a '⊏'-shaped section so as to cover the sides of the teeth 12 of the stator core 10. Further, the insulation film 30 includes the front end portions 33 bent inwardly from the respective ends of the side portions 32 so as to cover the sides of the teeth front end portions 13 protruded in both side directions from the front ends of the teeth 12 of the stator core 11 and end portions 34 bent outwardly from the ends of the front end portions 33 so as to cover the ends of the teeth front end portions 13.

The insulation film 30 having the above-mentioned structure is inserted into the slot formed between the teeth 12, while being locked to the locking structure arranged in the upper and lower insulators 20 and 20', thereby preventing escaping from the slot. Hereinafter, the locking structure in which the insulation film 30 is inserted and locked into the insulation space will be in detail discussed.

As mentioned above, the upper insulator 20 and the lower insulator 20' have the locking protrusions 25 and 25' protruded downwardly and upwardly from the inner sides of the front end supporting portions 23 and 23' thereof. The insulation film 30 is inserted into the insulation space, and the top and bottom end edges of the front end portions 33 are then insertedly fixed to the gaps formed between the front end supporting portions 23 and 23' and the locking protrusions 25 and 25' of the upper and lower insulators 20 and 20'.

In the stator for a compressor motor according to the present invention, after the insulation films 30 have been inserted into the slots of the stator core 10, the upper and lower insulators 20 and 20' are coupled to the upper and lower sides of the stator core 10 to assemble the stator core to one unit in a simple manner.

Then, the coils are wound on the teeth 12 of the stator core 10 insulated through the upper and lower insulators 20 and 20' and the insulation films 30.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

According to the present invention, there is provided the stator for a compressor motor that is configured wherein the ends of the insulation films inserted into the slots of the stator core are supportedly locked to the locking protrusions formed on the upper and lower insulators for insulating the upper and lower sides of the stator core, thereby allowing the insulation films to be securely supported and providing easy assembling process for the insulation film and the upper and lower insulators.

The invention claimed is:

1. A stator for a compressor motor having a stator core having an annular back yoke and a plurality of teeth protruded annularly inwardly from the inner periphery of the back yoke and having slots formed therebetween; an upper insulator having an annular body portion formed correspondingly to the back yoke of the stator core and a plurality of teeth insulating portions formed correspondingly to the teeth of the stator core in such a manner as to be protruded annularly from the body portion, thereby covering the upper sides of the teeth of the stator core; a lower insulator having an annular body portion formed correspondingly to the back yoke of the stator core and a plurality of teeth insulating portions formed correspondingly to the teeth of the stator core in such a manner as to be protruded annularly from the body portion, thereby covering the lower sides of the teeth of the stator core; a plurality of insulation films each adapted to be inserted into the slot so as to cover the side of the stator core exposed to the inside of the slot between the upper insulator and the lower insulator, each of the insulation films having a center portion adapted to cover the inner side of the back yoke of the stator core exposed to the slot between the upper insulator and the lower insulator and side portions extended bent from both sides of the center portion so as to cover the sides of the teeth of the stator core; and coils adapted to be wound on the teeth of the stator core enclosed by the upper insulator, the lower insulator and the insulation films, the stator comprising:

teeth front end portions protruded in both side directions from the front ends of the teeth of the stator core;

front end portions bent inwardly from the ends of the side portions of each of the insulation films so as to cover the inner sides of the teeth front end portions of the stator core;

front end supporting portions protruded downwardly from both sides of the teeth insulating portions of the upper insulator so as to cover the top end edges of the inner sides of the teeth front end portions of the stator core;

locking protrusions protruded downwardly from the inner sides of the front end supporting portions of the upper insulator in a state of being spaced apart from the front end supporting portions, such that the top end edges of the front end portions of each of the insulation films are supportedly inserted between the front end supporting portions and the locking protrusions;

front end supporting portions protruded upwardly from both sides of the teeth insulating portions of the lower insulator so as to cover the bottom end edges of the inner sides of the teeth front end portions of the stator core; and locking protrusions protruded upwardly from the inner sides of the front end supporting portions of the lower insulator in a state of being spaced apart from the front end supporting portions, such that the bottom end edges of the front end portions of each of the insulation films are supportedly inserted between the front end supporting portions and the locking protrusions.

2. The stator for a compressor motor according to claim 1, wherein the stator core has a plurality of coupling holes formed on the top and underside thereof, and the upper and lower insulators and have a plurality of coupling protrusions and formed at the positions corresponding to the coupling holes of the stator core in such a manner as to be inserted into the coupling holes of the stator core.

\* \* \* \* \*